(12) United States Patent
XiaoPing et al.

(10) Patent No.: US 8,803,813 B2
(45) Date of Patent: Aug. 12, 2014

(54) SENSING DEVICE

(75) Inventors: Jiang XiaoPing, Shanghai (CN); Liu Hua, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 828 days.

(21) Appl. No.: 11/432,130

(22) Filed: May 10, 2006

(65) Prior Publication Data

US 2007/0262962 A1 Nov. 15, 2007

(51) Int. Cl.
*G06F 3/041* (2006.01)
*G06F 3/0354* (2013.01)
*G06F 1/32* (2006.01)
*G06F 3/044* (2006.01)

(52) U.S. Cl.
CPC ........ *G06F 3/03548* (2013.01); *G06F 3/03547* (2013.01); *G06F 1/32* (2013.01); *G06F 2203/04111* (2013.01); *G06F 3/044* (2013.01)
USPC .......................... 345/173; 345/174; 178/18.01

(58) Field of Classification Search
USPC ...................... 345/173–178; 178/18.01–18.09
See application file for complete search history.

(56) References Cited

U.S. PATENT DOCUMENTS

| | | | |
|---|---|---|---|
| 5,099,386 A | 3/1992 | Stokes et al. | |
| 5,305,017 A | 4/1994 | Gerpheide | |
| 5,543,591 A | 8/1996 | Gillespie et al. | |
| 5,748,185 A | 5/1998 | Stephan et al. | |
| 5,943,052 A | 8/1999 | Allen et al. | |
| 6,188,391 B1 | 2/2001 | Seely et al. | |
| 6,380,931 B1 | 4/2002 | Gillespie et al. | |
| 6,414,671 B1 | 7/2002 | Gillespie et al. | |
| 6,642,857 B1 | 11/2003 | Schediwy et al. | |
| 6,704,005 B2 | 3/2004 | Kato et al. | |
| 6,825,890 B2 | 11/2004 | Matsufusa | |
| 6,925,611 B2 | 8/2005 | Sangiovanni | |
| 7,030,860 B1 | 4/2006 | Hsu et al. | |
| 7,129,935 B2 | 10/2006 | Mackey | |
| 7,151,276 B2 * | 12/2006 | Gerlach et al. | 257/40 |
| 7,202,859 B1 | 4/2007 | Speck et al. | |
| 7,439,962 B2 * | 10/2008 | Reynolds et al. | 345/173 |
| 7,463,246 B2 | 12/2008 | Mackey | |
| 7,663,607 B2 | 2/2010 | Hotelling et al. | |
| 2003/0064326 A1* | 4/2003 | Yamamoto et al. | 430/315 |
| 2003/0230438 A1* | 12/2003 | Keefer et al. | 178/18.05 |
| 2004/0130336 A1 | 7/2004 | Picollet et al. | |
| 2004/0178997 A1* | 9/2004 | Gillespie et al. | 345/173 |
| 2004/0239650 A1* | 12/2004 | Mackey | 345/174 |
| 2004/0252109 A1 | 12/2004 | Trent et al. | |
| 2005/0023145 A1* | 2/2005 | Cohen et al. | 205/118 |

(Continued)

OTHER PUBLICATIONS

Chapweske, Adam, "The PS/2 Mouse Interface", PS/2 Mouse Interfacing, 2001, 10 pages.

(Continued)

*Primary Examiner* — Premal Patel

(57) ABSTRACT

An apparatus and method for reducing charge time and power consumption of a sensor element of a sensing device. The apparatus may include a sensor element of a sensing device that has a surface area of conductive material and one or more gaps in the conductive material. The sensor element may include a plurality of evenly-spaced, parallel bars of conductive material and a plurality of interconnect lines coupled to the evenly-spaced, parallel bars to form the one or more gaps in the conductive material of the sensor element.

16 Claims, 14 Drawing Sheets

(56) References Cited

U.S. PATENT DOCUMENTS

2005/0231487 A1* 10/2005 Ming .......................... 345/173
2006/0066582 A1    3/2006 Lyon et al.
2006/0097991 A1    5/2006 Hotelling et al.

OTHER PUBLICATIONS

Mack, Chris, "Semiconductor Lithography—The Basic Process", Gentleman Scientist, 12 pages, downloaded Apr. 20, 2006, http://www.lithoguru.com/scientist/lithobasics.html.

"Photolithography", Wikipedia, the free encyclopedia, 3 pages, downloaded Apr. 20, 2006, http://en.wikipedia.org/wiki/Photolithography.

"CY8C21x34 Data Sheet" CSR User Module (CSR v1.0), Cypress Semiconductor Corporation, Oct. 6, 2005, pp. 1-36.

Ryan Seguine, et al., "Layout Guidelines for PSoC™ CapSense™", Cypress Application Note AN2292, Revision B, Oct. 31, 2005, pp. 1-15.

Dennis Seguine, "Capacitive Switch Scan", Cypress Application Note AN2233a, Revision B, Apr. 14, 2005, pp. 1-6.

* cited by examiner

--PRIOR ART--

--PRIOR ART--

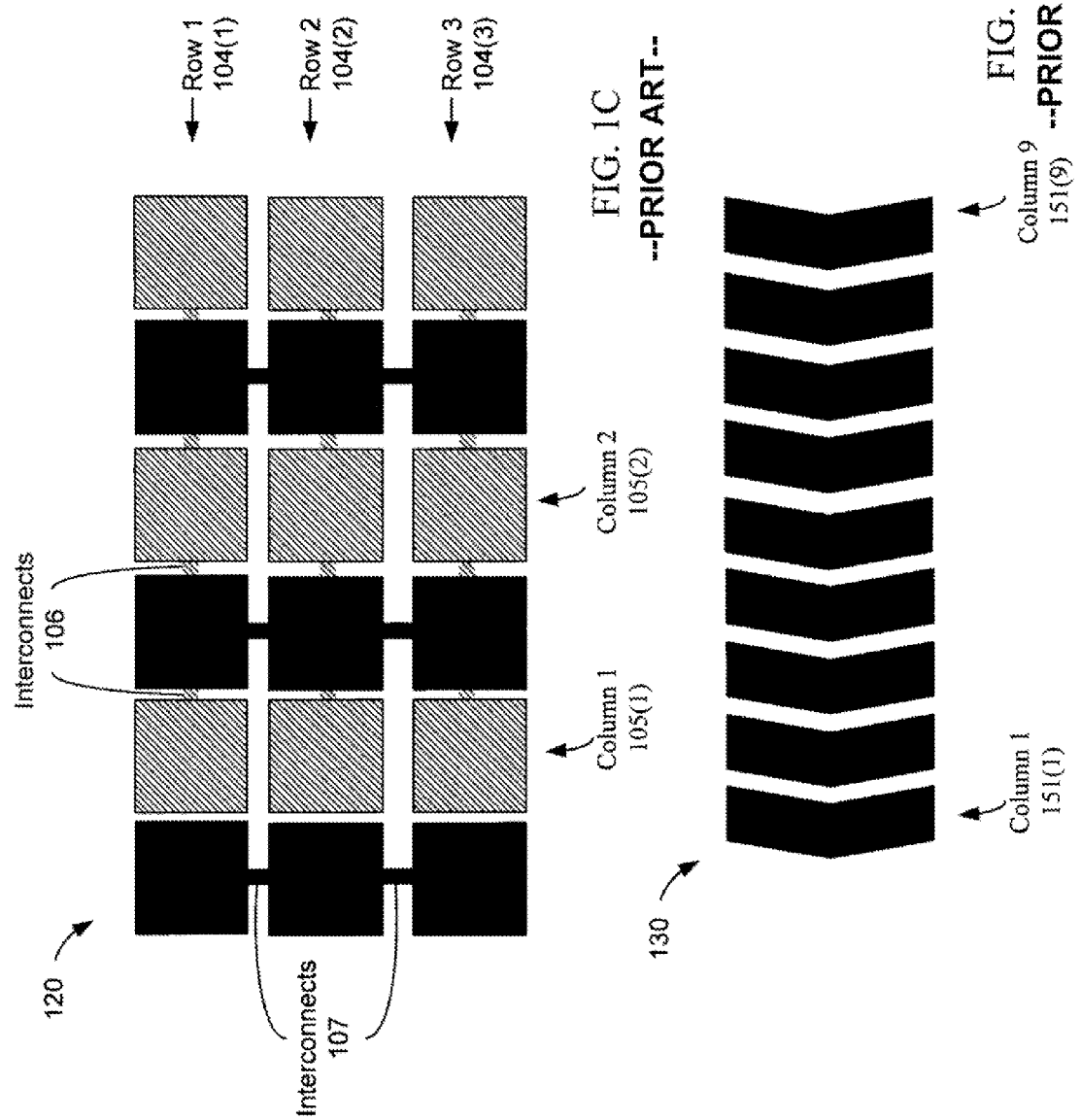

SENSING DEVICE

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

FIG. 1A illustrates a conventional touch-sensor pad. The touch-sensor pad 100 includes a sensing surface 101 on which a conductive object may be used to position a cursor in the x- and y-axes, or to select an item on a display. Touch-sensor pad 100 may also include two buttons, left and right buttons 102 and 103, respectively. These buttons are typically mechanical buttons, and operate much like a left and right button on a mouse. These buttons permit a user to select items on a display or send other commands to the computing device.

FIG. 1B illustrates a conventional linear touch-sensor slider. The linear touch-sensor slider 110 includes a surface area 111 on which a conductive object may be used to position a cursor in the x-axes (or alternatively in the y-axes). The construct of touch-sensor slider 110 may be the same as that of touch-sensor pad 100. Touch-sensor slider 110 may include a one-dimensional sensor array. The slider structure may include one or more sensor elements that may be conductive traces. Each trace may be connected between a conductive line and a ground. By being in contact or in proximity on a particular portion of the slider structure, the capacitance between the conductive lines and ground varies and can be detected. The capacitance variation may be sent as a signal on the conductive line to a processing device. For example, by detecting the capacitance variation of each sensor element, the position of the changing capacitance can be pinpointed. In other words, it can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling cursor positioning on a display) but, rather, may be used to actuate one or more functions associated with the sensing elements of the sensing device.

FIG. 1C illustrates a top-side view of a conventional two-dimensional sensor array 120 of touch-sensor pad 100. In this conventional design the sensor elements are squares, configured in a grid-like pattern. The square sensor elements are coupled together in rows and columns. Alternating columns correspond to x- and y-axis sensor elements. This conventional sensor array 120 includes three rows 104(1)-104(3) (illustrated as hashed squares) and three columns 105(1)-105(3) of sensor elements (illustrated as solid squares). The sensor elements of the rows and columns are coupled together by interconnects 106 and 107, respectively. Interconnects 106 and 107 may be on the same or different layers as the sensor elements. Each sensor element includes a solid surface area of conductive material. The touch-sensor pad layout grid-like pattern may be used to maximize the surface area covered by conductive material (e.g., copper), in relation to spaces necessary to define the rows and columns. Typically, each column and row is coupled to a single pin of a processing device.

FIG. 1D illustrates a top-side view of a conventional one-dimensional sensor array 130 of touch-sensor slider 110. In this conventional design the sensor elements are solid rectangular bars having two slanted sections. Each solid rectangular bar is a single column. This conventional sensor array 130 includes nine columns 151(1)-151(9) of sensor elements (illustrated as solid rectangular bars). Each sensor element includes a solid surface area of conductive material. The touch-sensor slider layout pattern may be used to maximize the surface area covered by conductive material (e.g., copper), in relation to spaces necessary to define the columns. Typically, one column (e.g., one sensor element) is coupled to a single pin of a processing device.

In touch-sensor pads and sliders, the surface area of the conductive material of each row and/or column is proportional to the charge time and charge current that is used in measuring the capacitance on each sensor element.

BRIEF DESCRIPTION OF THE DRAWINGS

The present invention is illustrated by way of example, and not by way of limitation, in the figures of the accompanying drawings.

FIG. 1C a top-side view of a conventional two-dimensional sensor array.

FIG. 1D illustrates a top-side view of a conventional one-dimensional sensor array of a touch-sensor slider.

DETAILED DESCRIPTION

Figure 1A:
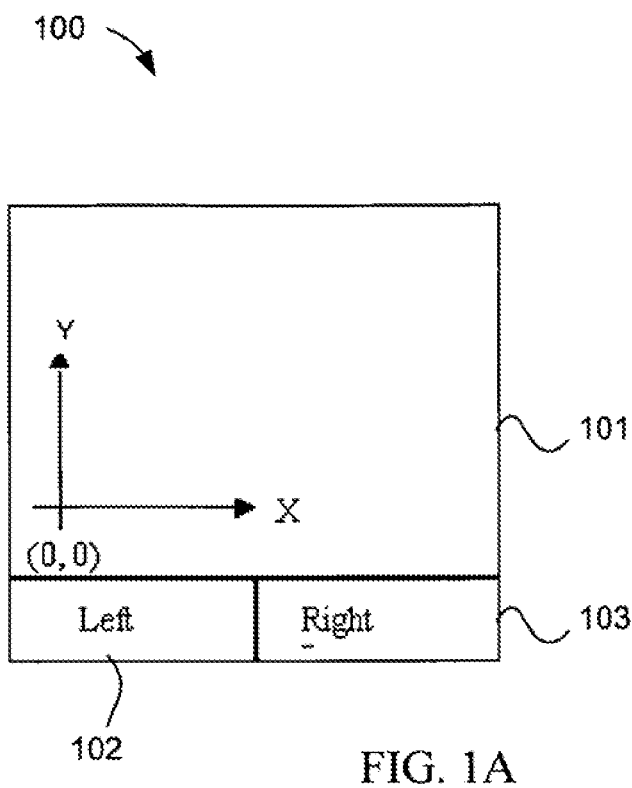
FIG. 1A illustrates a conventional touch-sensor pad.
Figure 1B:
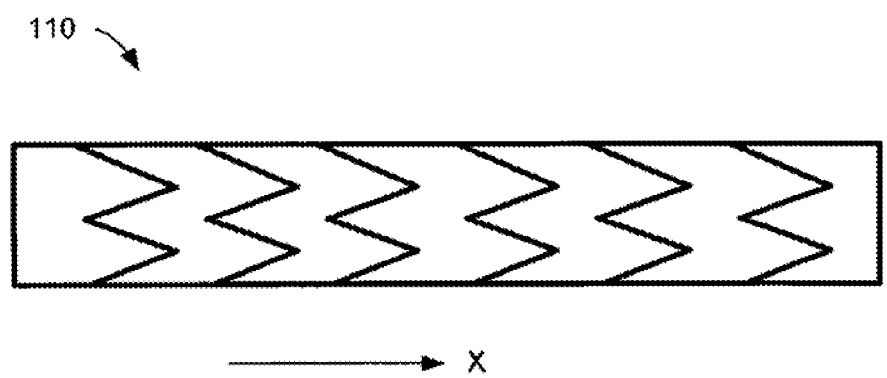
FIG. 1B illustrates a conventional linear touch-sensor slider.

Described herein is a method and apparatus for reducing charge time, and power consumption of sensor elements of a sensing device, such as a touch-sensor pad, touch-sensor slider, or a touch-sensor button. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to generate a sensor element, having a surface area that includes a conductive material, and one or more gaps in the conductive material. In one embodiment, the apparatus may include a sensor element having a plurality of evenly-spaced, parallel bars of the conductive material and a plurality of interconnect lines coupled to the evenly-spaced, parallel bars to form the one or more gaps in the conductive material. In another embodiment, the one or more gaps are disposed to form a honeycomb pattern in the conductive material of the sensor element.

In one embodiment, the method for generating a sensor element having one or more gaps in the conductive material of a surface area of a sensor element is performed using additive photolithography techniques. In another embodiment, subtractive photolithography techniques are used. In another embodiment, impurity doping techniques may be used. Alternatively, the surface area having the conductive material and the one or more gaps in the conductive area may be generated by other manufacturing techniques, such as manufacturing techniques used in film deposition, patterning, and semiconductor doping.

Embodiments described herein include reducing the surface area of the conductive material of the sensing device (e.g., touch-sensor pad, touch-sensor slider, or a touch-sensor button). By reducing the surface area, the charge time and/or charge current may be reduced. Reducing charge time and/or charge current allows for a lower power design than the conventional touch-sensor devices. Reducing charge time and/or charge current may also allow for a shorter scan time than the conventional touch-sensor devices. For example, the larger the surface area of each sensor element the longer time it takes to charge and measure each sensor element of a sensor array. Similarly, the larger the surface area of each sensor element the more power that is consumed during the scanning of each sensor element of a sensor array.

By substantially maintaining the shapes of outer contours of the sensor elements and reducing the surface area by generated one or more gaps on the conductive material of the sensor element as described herein, the surface area may be reduced without any performance loss of the sensing device.

In one embodiment, the sensing device includes interconnected, evenly-spaced bars of conductive material to replace a solid bar of the conventional touch-sensing devices. The evenly-spaced bars are disposed to form one or more gaps between the evenly-spaced bars. In other words, the bar of the conventional touch-sensing devices may be replaced with multiple interconnected sub-bars. The multiple interconnected sub-bars may be configured to substantially form the same shape (e.g., of the outer contour) of the sensor element as the conventional touch-sensing device. However, because the configuration forms a pattern having one or more gaps in the conductive material, the surface area of the sensor element is reduced.

As mentioned above, the charge time and current are proportional to the surface area of the sensor element, as represented in the following equations (1).

$$\left. \begin{array}{l} C = \dfrac{Q}{V} = \dfrac{it}{V} \\ C = \dfrac{\varepsilon_0 S}{d} \end{array} \right\} \Rightarrow \dfrac{i*t}{V} = \dfrac{\varepsilon_0 S}{d} \qquad (1)$$

Typically, the reference voltage (V) is fixed, for example, 1.3 volts. Moreover, two sliders having the same material, dimensions, and techniques for measuring capacitance have the same $\varepsilon_0$ and d. The value for $\varepsilon_0$ is the value of the dielectric constant for the PCB material. For example, a PCB material of FR4 has a dielectric constant of approximately 4.3. The value for d is the distance between the sensing device and a ground plane. Accordingly, i*t is proportional to S. That is, the charge time and charge current (e.g., i*t) are a function of the surface area (e.g., i*t=k(S)). By generating a surface area of a sensor element having one or more gaps in the conductive material, the surface area (S) is smaller than the sensor elements of the conventional sensor elements.

In one embodiment, the one or more gaps may be generated by removing areas of conductive material (e.g., gaps) from the surface area. In another embodiment, the one or more gaps may be generated by removing areas of conductive material (e.g., gaps) from the surface area, and then adding interconnect lines between the remaining surface areas. In one exemplary embodiment, the conductive material of the sensor element on the printed circuit board (PCB) has a thickness of copper-clad of approximately 1 oz, which is approximately equal to 0.035 mm. Alternatively, the copper-clad may have a thickness of other values, such as approximately 0.5, 2, or 3 oz. The added side surface, exposed by removing the gaps of conductive material, can be neglected in the total surface area of the sensor element. Accordingly, the total reduced area nearly equals the surface area of the gaps.

In another embodiment, the one or more gaps in the conductive material may be formed by generating a pre-determined pattern for the surface area of the sensor element. The pre-determined pattern may be generated (e.g., on the PCB) using manufacturing techniques, such as additive and subtractive photolithography, impurity doping, or the like.

Figure 2:
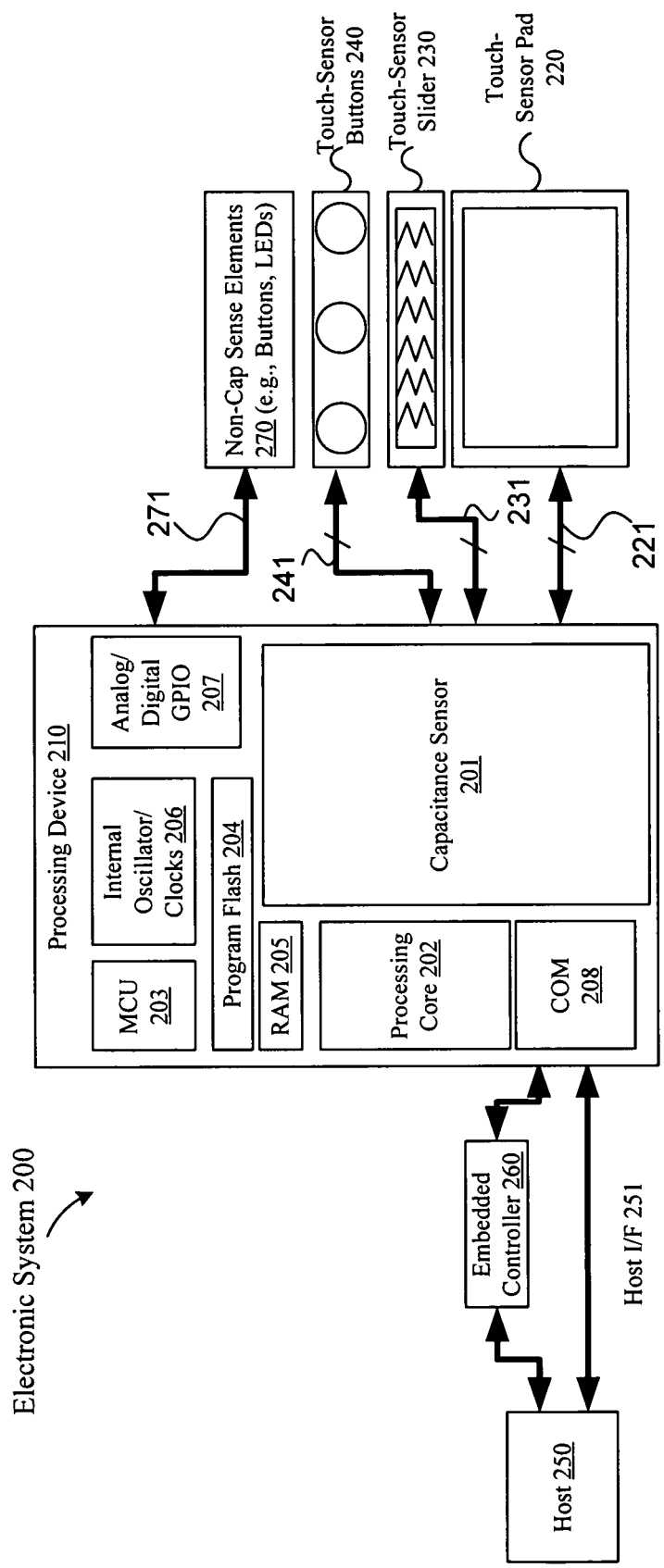
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch-sensor slider 230, or a touch-sensor button 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected. Alternatively, the tap gesture may be recognized using other techniques, such as detecting a presence of a conductive object on a sensing device, determining a velocity of the detected presence of the conductive object, and recognizing a tap gesture based on the velocity.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
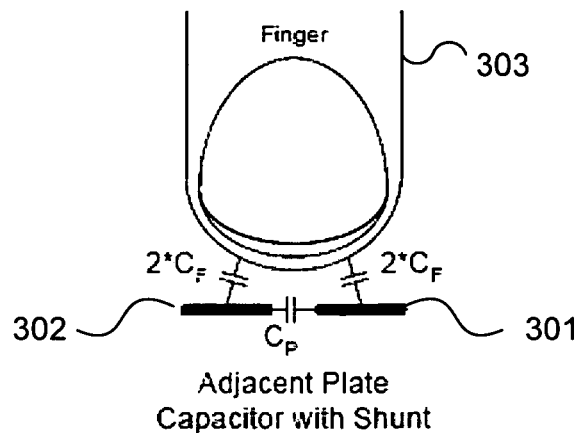
FIG. 3A illustrates a varying switch capacitance.
Figure 3B:
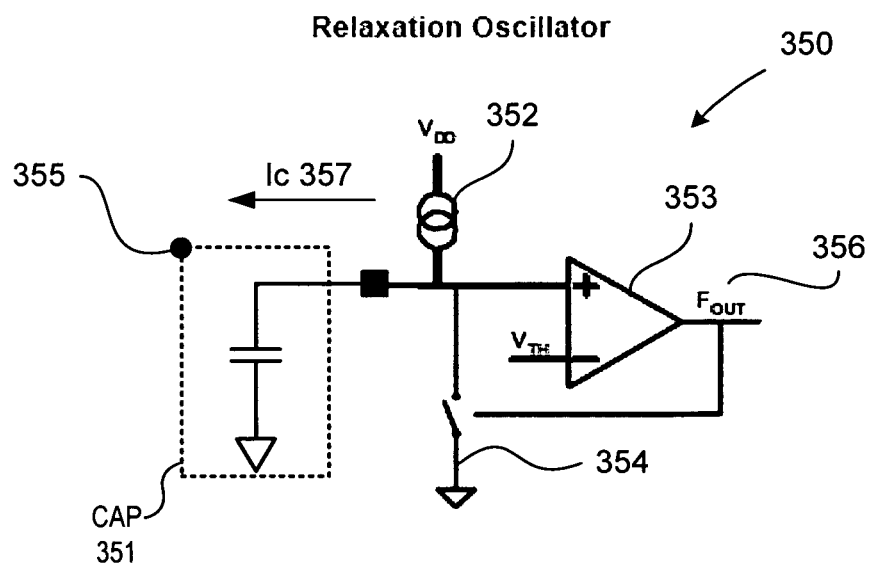
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (Cf). Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (2) describes the relation between current, capacitance, voltage and time for a charging capacitor.

$$CdV = I_C dt \quad (2)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (2). By comparing $f_{RO}$ of $F_{OUT}$ 356 against the frequency ($f_{REF}$) of a known reference system clock signal (REF CLK), the change in capacitance ΔC can be measured. Accordingly, equations (3) and (4) below describe that a change in frequency between $F_{OUT}$ 356 and REF CLK is proportional to a change in capacitance of the capacitor 351.

$$\Delta C \propto \Delta f, \text{ where} \quad (3)$$

$$\Delta f = f_{RO} - f_{REF}. \quad (4)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
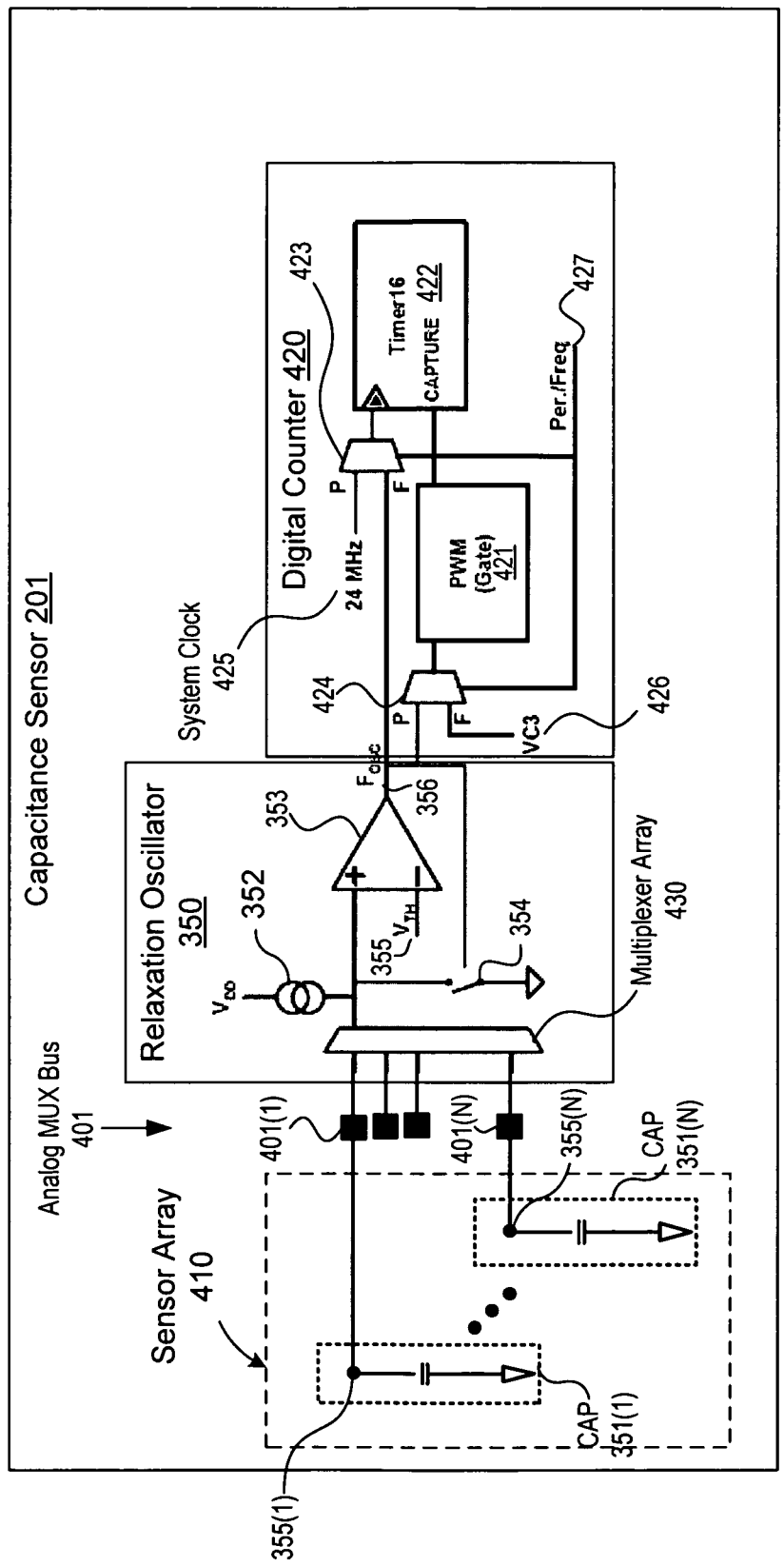
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \quad (5)$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \quad (6)$$

Adding some margin to yield 2500 counts, and running the frequency measurement method at 1.0 MHz, the detection time for the switch is 4 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \quad (7)$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \quad (8)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent sensor elements that are electrically isolated (e.g., PCB pads or traces), as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \quad (9)$$

The dimensions of equation (9) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$Centroid = \frac{n_{i-1} \cdot (i-1) + n_i i + n_{i+1} \cdot (i+1)}{n_{i-1} + n_i + n_{i+1}} \quad (10)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
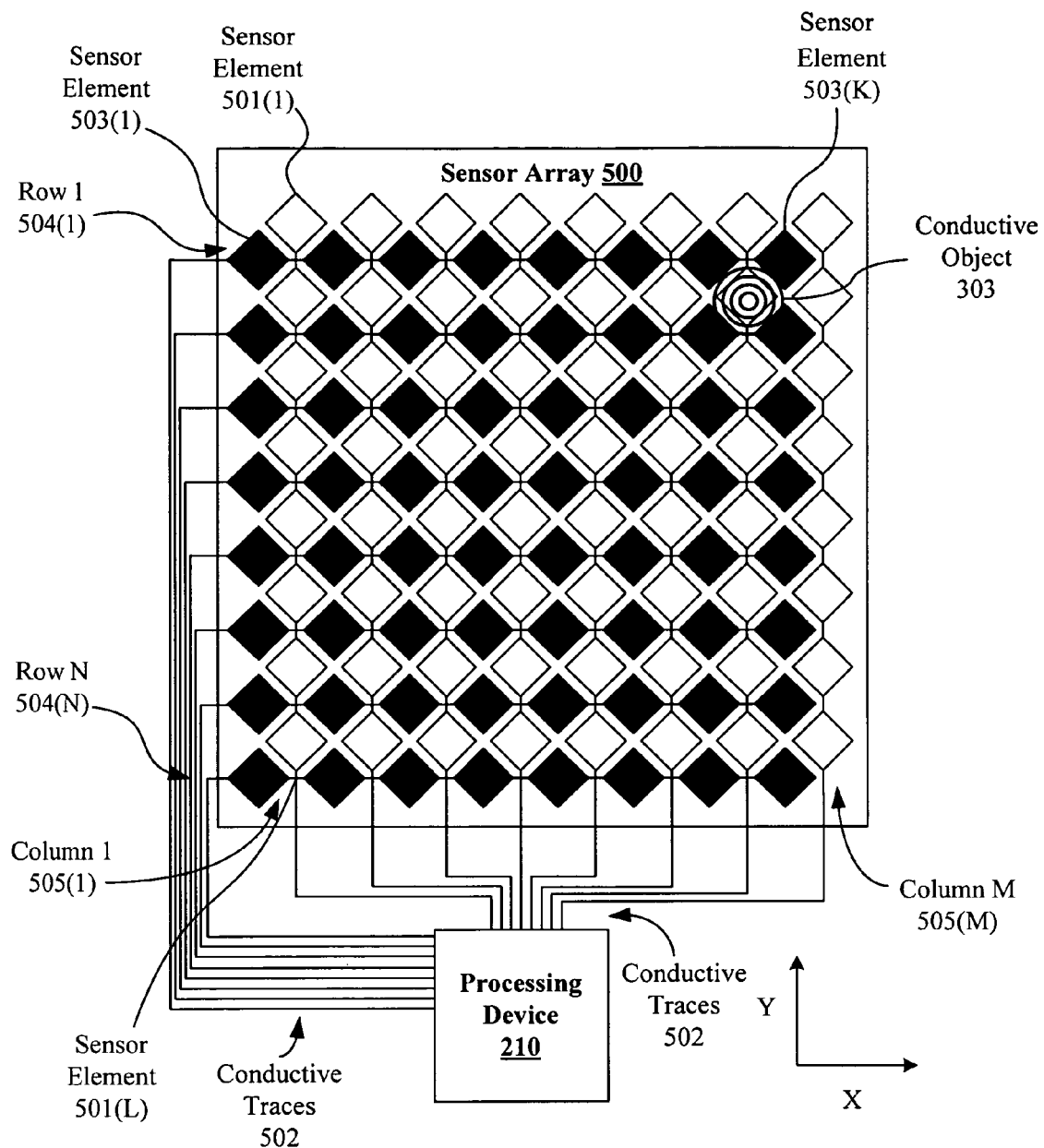
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array having a plurality of sensor elements for detecting a presence of a conductive object 303 on the sensor array 500 of a touch-sensor pad. Touch-sensor pad 220 includes a sensor array 500. Sensor array 500 includes a plurality of rows 504(1)-504(N) and a plurality of columns 505(1)-505(M), where N is a positive integer value representative of the number of rows and M is a positive integer value representative of the number of columns. Each row includes a plurality of sensor elements 503(1)-503(K), where K is a positive integer value representative of the number of sensor elements in the row. Each column includes a plurality of sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
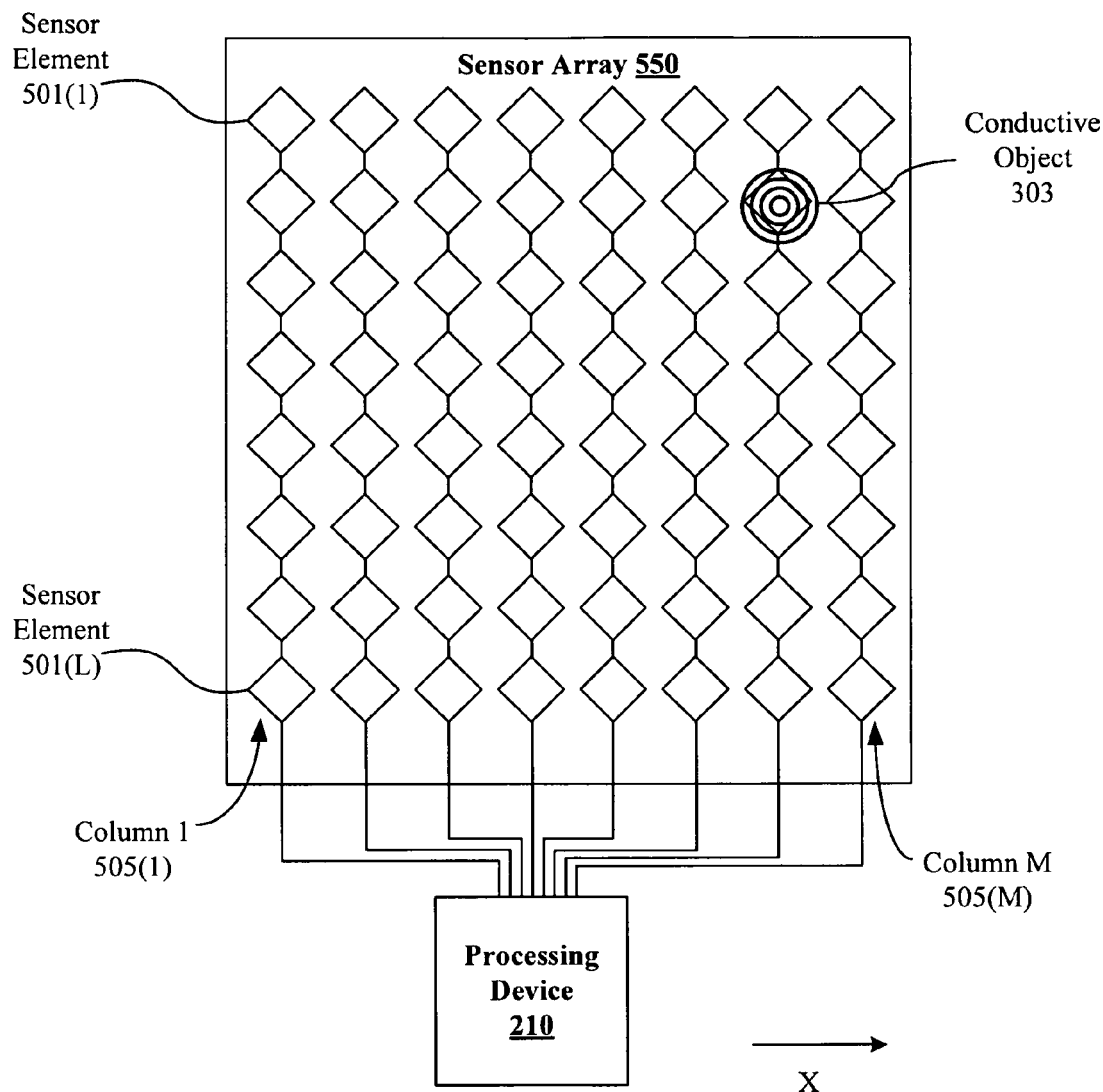
FIG. 5B illustrates a top-side view of one embodiment of a sensor array having a plurality of sensor elements for detecting a presence of a conductive object on the sensor array of a touch-sensor slider.

FIG. 5B illustrates a top-side view of one embodiment of a sensor array having a plurality of sensor elements for detecting a presence of a conductive object 303 on the sensor array 550 of a touch-sensor slider. Touch-sensor slider 230 includes a sensor array 550. Sensor array 550 includes a plurality of columns 504(1)-504(M), where M is a positive integer value representative of the number of columns. Each column includes a plurality of sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
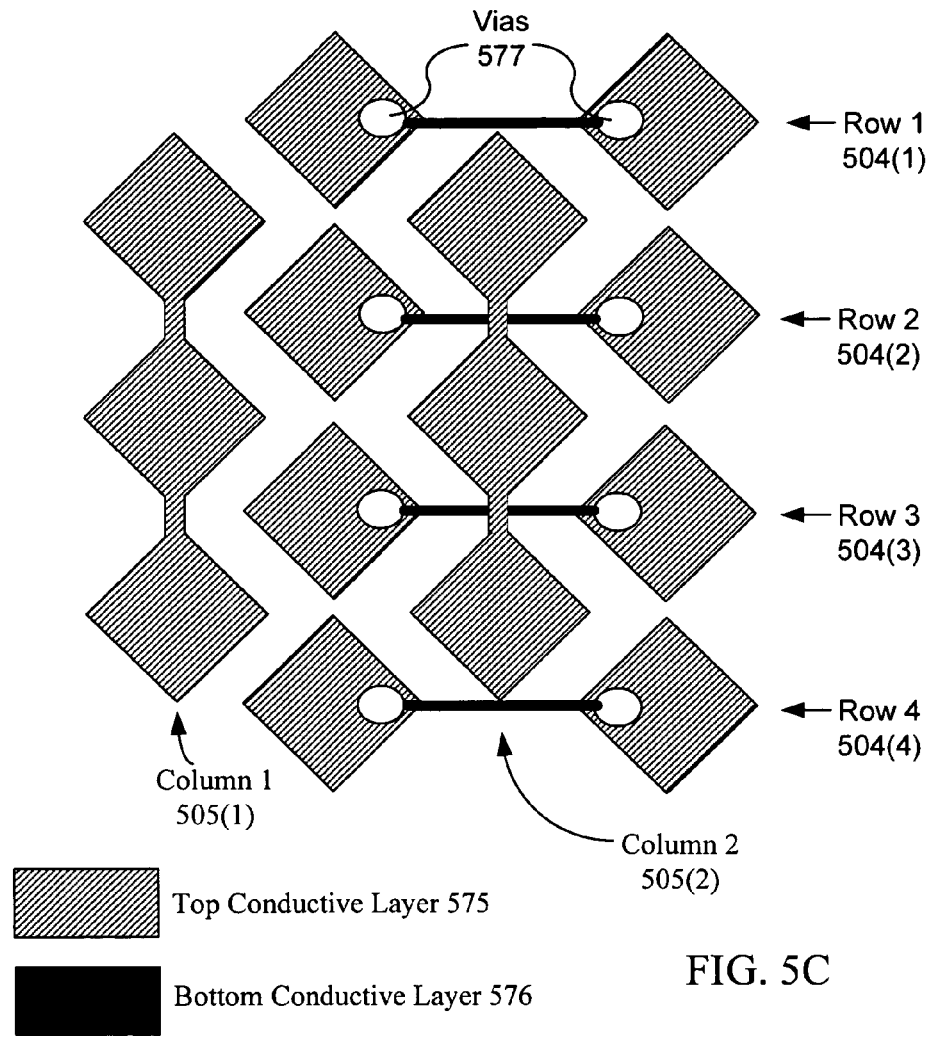
FIG. 5C illustrates a top-side view of one embodiment of a two-layer touch-sensor pad.
Figure 5D:
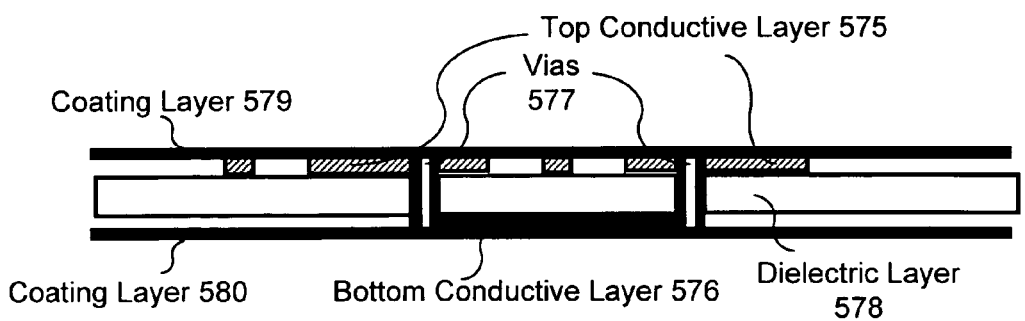
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the senor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 589 are applied to the surfaces opposite to the surfaces that are coupled to the dielectric layer 578 on both the top and bottom conductive layers 575 and 576.

It should be noted that the space between coating layers 579 and 589 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6A:
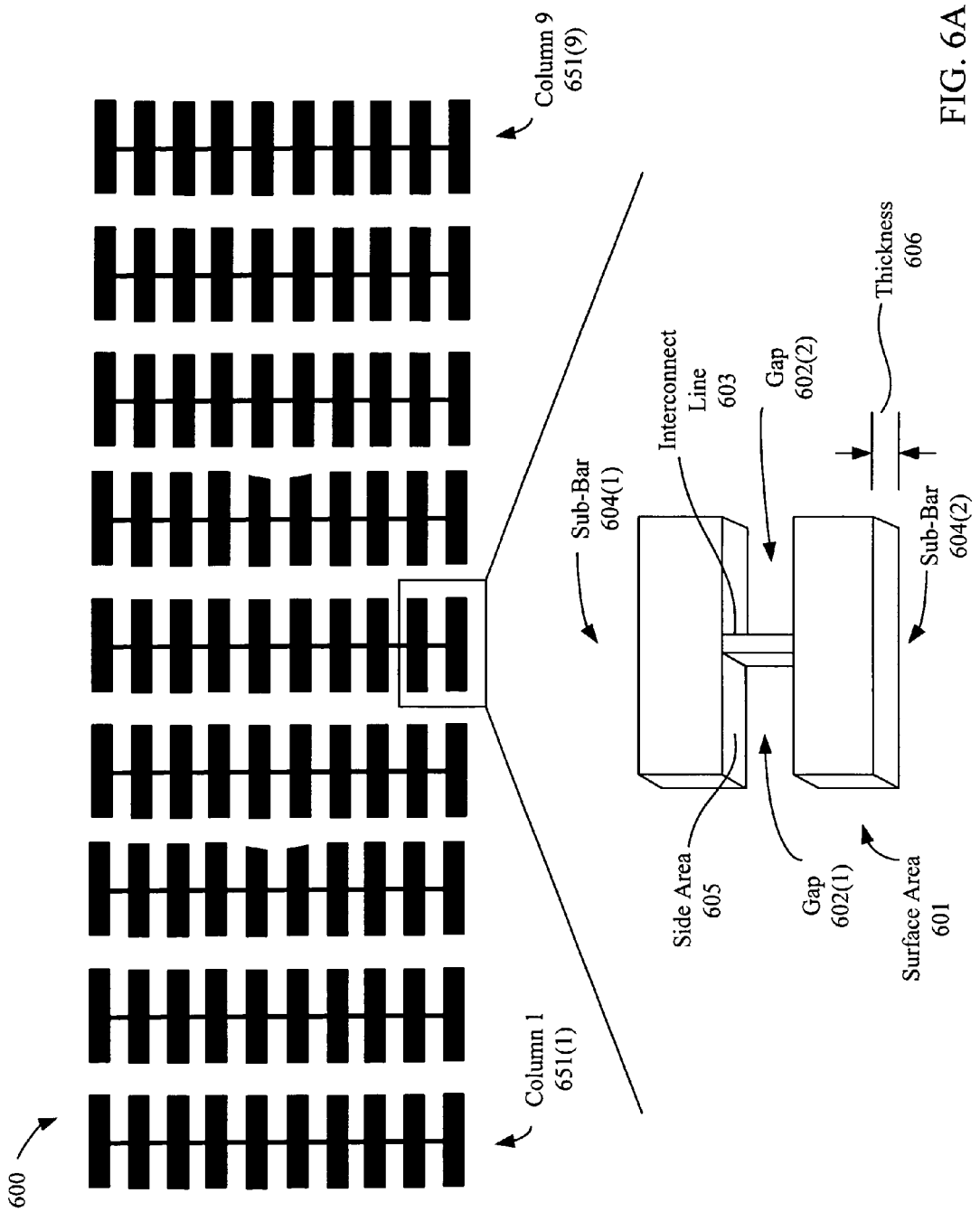
FIG. 6A illustrates a top-side view of one embodiment of a sensor array of sensor elements of a touch-sensor slider having one or more gaps in the conductive material of the sensor elements.

FIG. 6A illustrates a top-side view of one embodiment of a sensor array of sensor elements of a touch-sensor slider having one or more gaps in the conductive material of the sensor elements. Sensor array 600 includes multiple columns 651(1)-651(9). In this embodiment, the sensor element of each column includes multiple evenly-spaced, parallel bars of conductive material. Each sensor element has an outer contour of a substantially rectangular bar, formed of multiple evenly-spaced, parallel bars (e.g., sub-bars). The evenly-spaced, parallel bars of one column are connected to each other by interconnect lines (e.g., 603). The multiple sensor elements are also configured in evenly-spaced, parallel bars. The evenly-spaced, parallel bars of each column and the interconnect lines form multiple gaps in the conductive material of the sensor element. The multiple gaps in the conductive material provides a reduced total surface area of each sensor element (e.g., of each column). Each column may be coupled to a pin of the processing device 210. In one embodiment, the interconnect lines may have the same material as the material of the sensor elements. Alternatively, the interconnect lines may have different material than the material of the sensor elements.

FIG. 6A also illustrates an expanded view of two sub-bars 604(1) and 604(2) of a column, column 651(5). The lower portion of the sensor element of column 651(5) includes two sub-bars that are evenly-spaced, parallel bars of conductive material. Interconnect line 603 is coupled to the two sub-bars 604(1) and 604(2), and together, they form the two gaps 602(1) and 602(2). In one exemplary embodiment, the conductive material of the sensor element on the PCB has a thickness 606 (e.g., copper-clad less than 1 oz, which is approximately equal to 0.035 mm). Side area 605 is formed (or exposed) because of the one or more gaps. The side surface 605 can be neglected in calculating the total surface area of the sensor element. Accordingly, the total reduced area nearly equals the surface area of the one or more gaps in the conductive material.

In another embodiment, the one or more gaps in the conductive material may be formed by generating a pre-determined pattern for the surface area of the sensor element. The pre-determined pattern may be generated (e.g., on the PCB) using manufacturing techniques, such as additive and subtractive photolithography, impurity doping, or the like. Alternatively, the one or more gaps may be formed by generating a surface area of the conductive material, removing the one or more gaps in the conductive material, and adding the interconnect lines to couple the non-removed conductive material.

In one embodiment, the interconnect lines are coupled to the sub-bars in a substantially center position, as illustrated in FIG. 6A. Alternatively, the interconnect lines may be coupled to the sub-bars at one end of the sub-bars.

In one embodiment, the multiple columns 651(1)-651(9) of sensor elements is a one-dimensional sensor array of a touch-sensor slider. Alternatively, the multiple columns may be used in a multi-dimensional sensor array of a touch-sensor pad.

Figure 8:
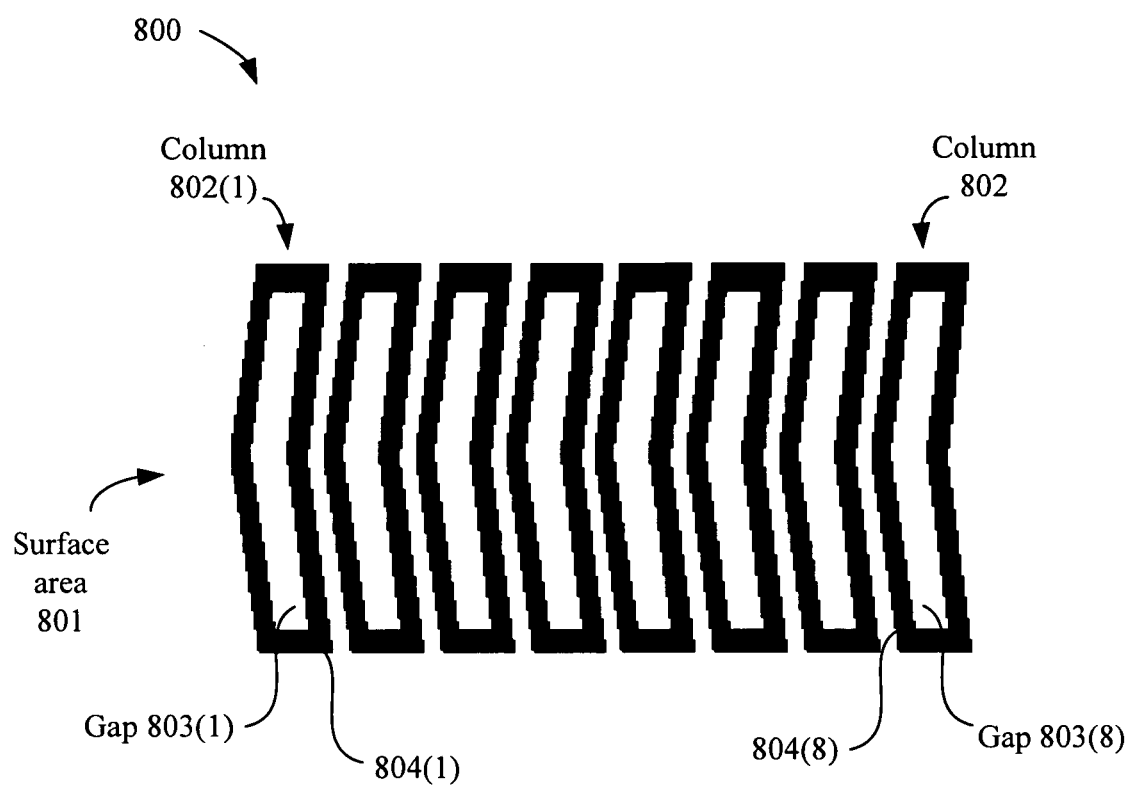
FIG. 8 illustrates a top-side view of another embodiment of a sensor array of sensor elements of a touch-sensor slider having one or more gaps in the conductive material of the sensor elements.

In one embodiment, the sub-bars (e.g., that make up the sensor elements) have a substantially rectangular shape, as illustrated in FIG. 6A. Alternatively, the sub-bars (e.g., remaining surface area of conductive material) may have a substantially square shape, diamond shape, hexagon shape, or circular shape. In other words, the embodiments described herein are not limited to evenly-spaced parallel bars, but may include square shapes, diamond shapes, hexagon shapes, circular shapes, trapezoidal shapes, or the like. Alternatively, the embodiments described herein may include non-evenly spaced shapes, or non-parallel shapes. Similarly, the gaps themselves may have various shapes, and sizes. For examples, the gaps may have a substantially rectangular, square, diamond, hexagonal, circular shapes, or the like. Alternatively, the surface area of conductive material and the one or more gaps may have other pre-determined patterns. In one embodiment, the shapes of the gaps may have the same shape as the shape of the sensor elements. In other words, the outer contour of the sensor element may be the same shape as outer contour of the gaps. For example, sub-bars 604(1) and 604(2) are rectangular shaped, and the outer contours of the sensor elements are rectangular shaped (e.g., rectangular columns). Alternatively, they may have different shapes. In another embodiment, the gaps may have the same shape, but at a smaller proportion than the outer contour of the sensor elements, as illustrated in FIG. 8.

Figure 6B:
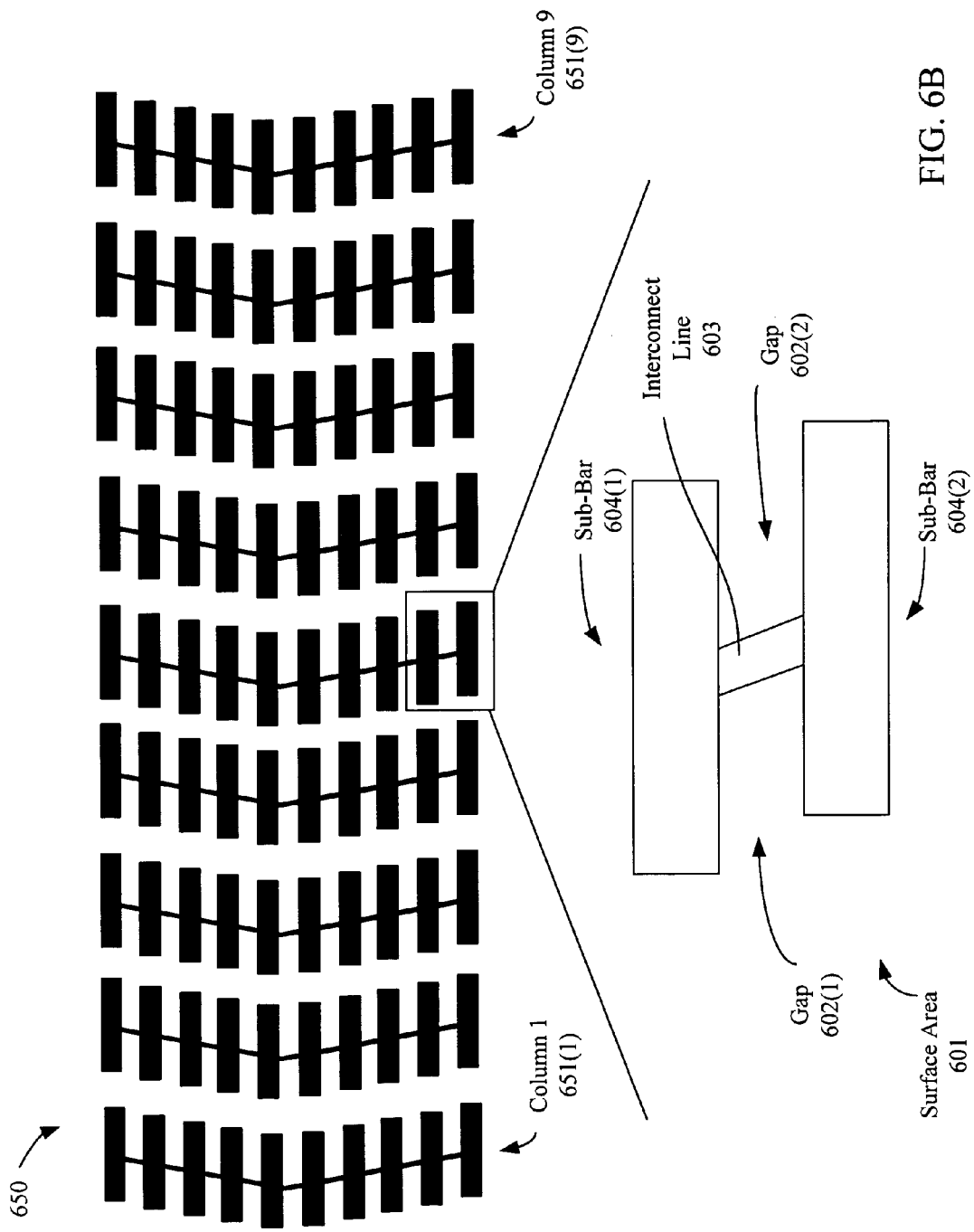
FIG. 6B illustrates a top-side view of another embodiment of a sensor array of sensor elements of a touch-sensor slider having one or more gaps in the conductive material of the sensor elements.

FIG. 6B illustrates a top-side view of another embodiment of a sensor array of sensor elements of a touch-sensor slider having one or more gaps in the conductive material of the sensor elements. Sensor array 650 also includes multiple columns of sensor elements of evenly-spaced, parallel bars (e.g., sub-bars) of conductive material. Sensor array 650 of FIG. 6B is similar to the sensor array 600 of FIG. 6A, except the evenly-spaced, parallel bars of FIG. 6B are configured in a dual-slanted bar configuration. Each sensor element has an outer contour of a substantially rectangular bar, formed of multiple evenly-spaced, parallel bars (e.g., sub-bars); however, the substantially rectangular bar is slanted in two directions from a center line of the bar. In one embodiment, the slanted bars may be used so that the conductive object can be detected on more bars than on a slider that does not have slanted bars.

Figure 7A:
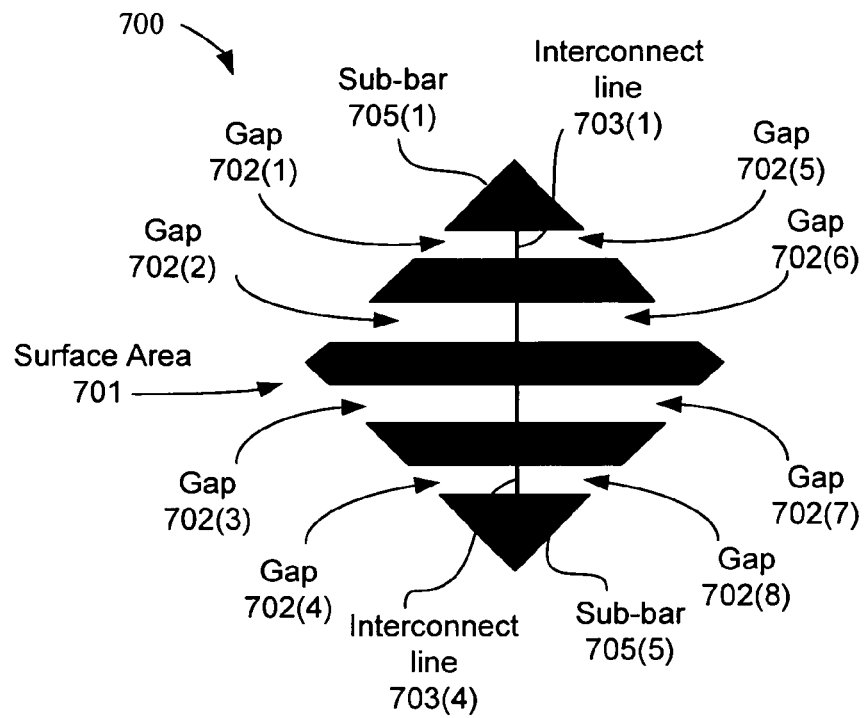
FIG. 7A illustrates a top-side view of one embodiment of a sensor array of sensor elements of a touch-sensor pad having one or more gaps in the conductive material of the sensor elements.
Figure 7A:
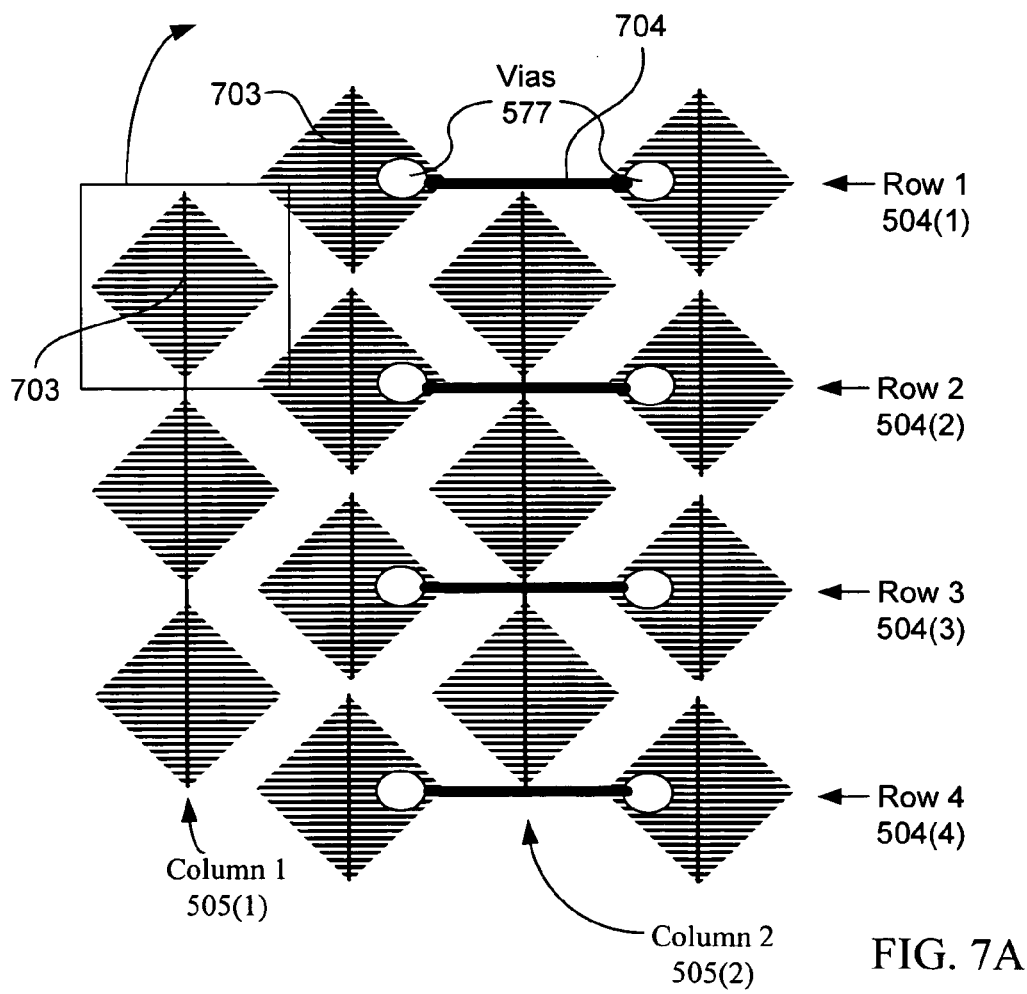

FIG. 7A illustrates a top-side view of one embodiment of a sensor array of sensor elements of a touch-sensor pad having one or more gaps in the conductive material of the sensor elements. Sensor array 700 includes multiple columns 505(1)-505(2) and multiple rows 504(1)-504(4). In this embodiment, the sensor elements of the columns and rows each include multiple evenly-spaced, parallel bars. Each sensor element has an outer contour of a substantially diamond shape, formed of multiple evenly-spaced, parallel bars (e.g., sub-bars). The evenly-spaced, parallel bars of each sensor element are connected to each other by interconnect lines (e.g., 703). As described with respect to FIGS. 5C and 5D, the sensor element of the row are connected by conductive paths 704 through vias 577 to another layer of the PCB. The evenly-spaced, parallel bars of each sensor element and the interconnect lines form multiple gaps in the conductive material of the surface area of each sensor element. This reduces the total surface area of each sensor element (e.g., of each column and row). Each column and row may be coupled to a pin of the processing device 210. In one embodiment, the interconnect lines and the multiple evenly-spaced, parallel bars are the same material. Alternatively, the interconnect lines and the multiple evenly-spaced, parallel bars are different materials.

FIG. 7A also illustrates an expanded view of one sensor element having five sub-bars 705(1)-705(5) of a column, column 505(1). The sensor element of column 505(1) includes five sub-bars that are evenly-spaced, parallel bars of conductive material. Interconnect line 703 is coupled to the five sub-bars 705(1)-705(5), and together, they form the eight gaps 702(1)-702(8). Alternatively, multiple segments of interconnect line 703 (e.g., such as four segments 703(1)-703(4)) may be used to coupled the sub-bars 705(1)-705(5) to one another.

In one embodiment, the multiple columns 505(1)-505(2) and rows 504(1)-504(4) of sensor elements are a two-dimensional sensor array of a touch-sensor pad.

In one embodiment, the sub-bars (e.g., that make up the sensor elements) have a substantially trapezoidal shape, as illustrated in FIG. 7A. Alternatively, the sub-bars (e.g., remaining surface area) may have a substantially square shape, diamond shape, hexagon shape, circular shape, or the like. In other words, the embodiments described herein are not limited to evenly-spaced parallel bars, but may include square shapes, diamond shapes, hexagon shapes, circular shapes, trapezoidal shapes, or the like. Alternatively, the embodiments described herein may include non-evenly spaced shapes, or non-parallel shapes. Similarly, the gaps themselves may have various shapes, and sizes. For examples, the gaps may have a substantially rectangular, square, diamond, hexagonal, circular shapes, or the like. Alternatively, the surface area of conductive material and one or more gaps may have other pre-determined patterns. In one embodiment, the shapes of the gaps may have the same shape as the shape of the sensor elements. In other words, the outer contour of the sensor element may be the same shape as the outer contour of the gaps. Alternatively, they may have different shapes. For example, sub-bars 705(1)-705(5) are trapezoidal shaped, and the outer contours of the sensor elements are diamond shaped. In another embodiment, the gaps may have the same shape, but at a smaller proportion than the sensor elements, as illustrated in FIG. 8.

Figure 7B:
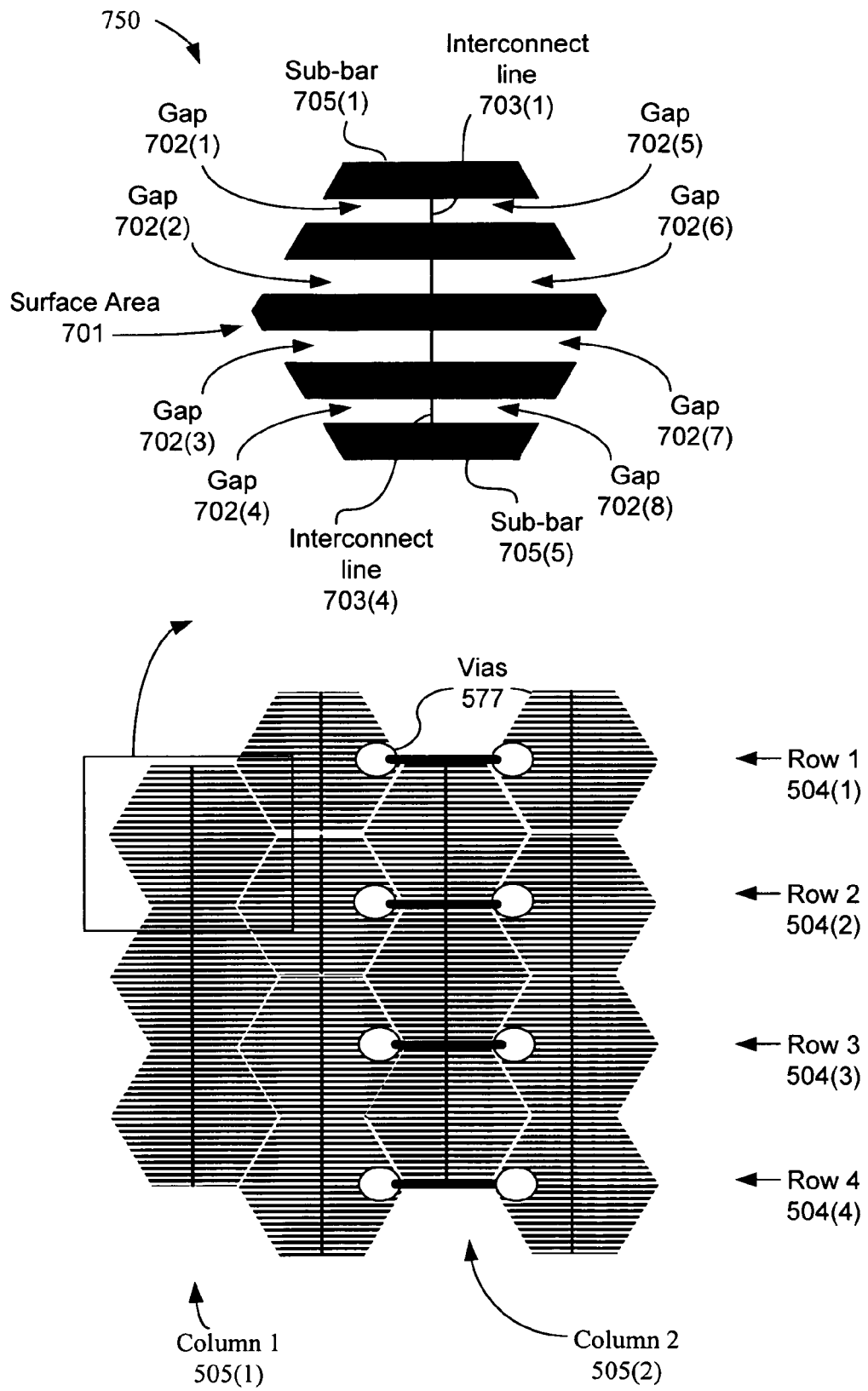
FIG. 7B illustrates a top-side view of another embodiment of a sensor array of sensor elements of a touch-sensor pad having one or more gaps in the conductive material of the sensor elements.

FIG. 7B illustrates a top-side view of another embodiment of a sensor array of sensor elements of a touch-sensor pad having one or more gaps in the conductive material of the sensor elements. The sensor array 750 of 7B is similar to the sensor array 700 of FIG. 7A, expect that the outer counter shape of the sensor element is a hexagonal shape, instead of a diamond shape.

Similar to FIGS. 6A and 6B, the conductive material of the sensor elements of FIGS. 7A & 7B have a thickness (e.g., copper-clad less than 1 oz, which is approximately equal to 0.035 mm), forming a side area by the absence of conductive material in the gaps. However, this side surface can be neglected in calculating the total surface area of the sensor element. Accordingly, the total reduced area nearly equals the surface area of the one or more gaps in the conductive material.

In one embodiment, the interconnect lines are coupled to the sub-bars in a substantially center position, as illustrated in FIGS. 7A and 7B. Alternatively, the interconnect lines may be coupled to the sub-bars at one end of the sub-bars, as illustrated in FIG. 7C.

Figure 7C:
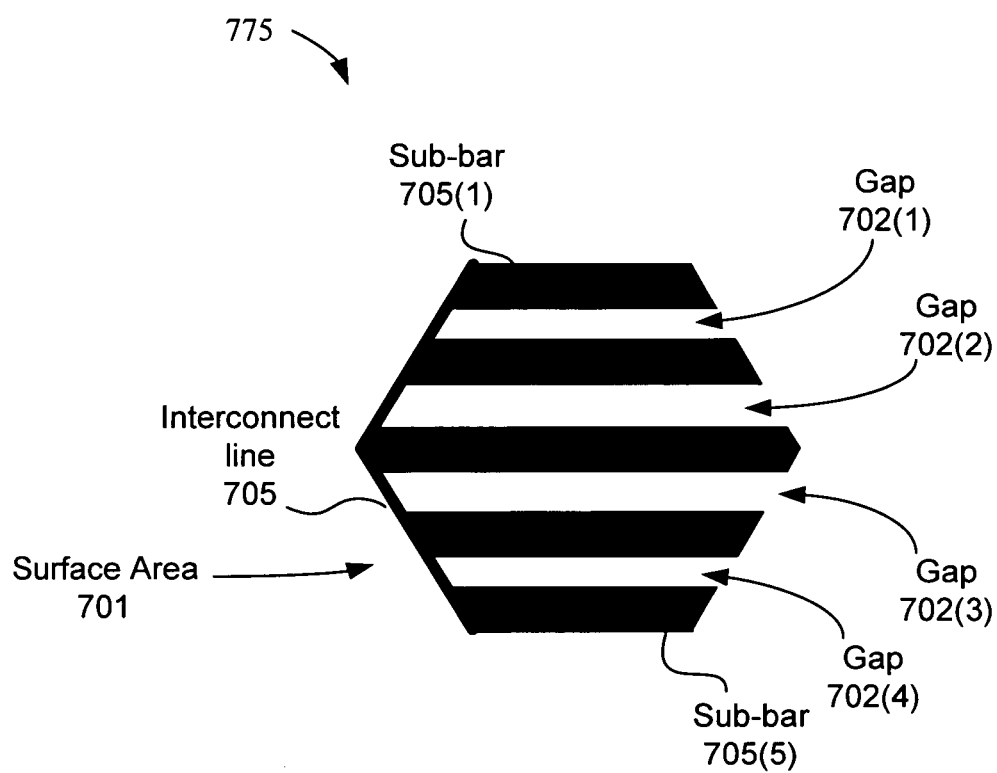
FIG. 7C illustrates a top-side view of another embodiment of a sensor array of sensor elements of a touch-sensor pad having one or more gaps in the conductive material of the sensor elements.

FIG. 7C illustrates a top-side view of another embodiment of a sensor array of sensor elements of a touch-sensor pad having one or more gaps in the conductive material of the sensor elements. The sensor array 775 of 7C is similar to the sensor arrays 700 and 750 of FIGS. 7A and 7B, expect that the interconnect lines are disposed such that they are connected to the sub-bars at one end of the sub-bars, forming four gaps, gaps 702(1)-702(4).

FIG. 8 illustrates a top-side view of another embodiment of a sensor array of sensor elements of a touch-sensor slider having one or more gaps in the conductive material of the sensor elements. Sensor array 800 includes multiple columns 802(1)-802(8). In this embodiment, the sensor element of each column includes multiple evenly-spaced, parallel bars of conductive material, configured in a dual-slanted bar configuration, much like sensor array 650 of FIG. 6B. Each sensor element has an outer contour of a substantially rectangular bar, having a surface area of the conductive material and one or more gaps in the conductive material; however, the substantially rectangular bar is slanted in two directions from a center line of the bar. The conductive material of the surface area 801 has one gap in the conductive material of each sensor element (e.g., 803(1)). The remaining conductive material 804(1)-804(8) on each sensor element surrounds the gap 803(1), such that no interconnect lines are needed on the sensor element. In this embodiment, the shape of the gaps is proportional to the outer counter shape of the sensor element. Alternatively, other shapes of gaps may be used. Generating gaps in the conductive material of the surface area of each sensor element reduces the total surface area of each sensor element (e.g., for each column and row). Each column and row may be coupled to a pin of the processing device 210.

In another embodiment, the one or more gaps in the conductive material may be formed by generating a pre-determined pattern for the surface area of the sensor element. The pre-determined pattern may be generated (e.g., on the PCB) using manufacturing techniques, such as additive and subtractive photolithography, impurity doping, or the like. Alternatively, the one or more gaps may be formed by generating a surface area of conductive material, removing the one or more gaps in the conductive material, and adding the interconnect lines to couple the non-removed conductive material.

In one embodiment, the multiple columns 802(1)-802(8) of sensor elements is a one-dimensional sensor array of a touch-sensor slider. Alternatively, the multiple columns may be used in a multi-dimensional sensor array of a touch-sensor pad.

The shapes and patterns of the sensor elements described herein may be generated using manufacturing techniques known by those of ordinary skill in the art. For example, lithography and etching may be used. Lithography is the process of transferring patterns of geometric shapes on a mask to a thin layer of radiation-sensitive material (also known as resist), covering the surface of a semiconductor wafer. These patterns define the various regions in an integrated circuit such as the sensor elements of the sensing device. The resist patterns defined by the lithographic process are not permanent elements of the final device but only replicas of circuit features. The pattern transfer is accomplished by an etching process which selectively removes unmasked portions of a layer. The etching process may include wet chemical etching, plasma etching, or dry etching techniques to remove portions of the conductive materials.

One type of lithography is photolithography (also known as optical lithography). In photolithography the resist is a photoresist layer. Photoresist is a chemical that hardens when exposed to light (often ultraviolet). The photoresist layer is selectively "hardened" by illuminating it in specific places. A transparent plate, also referred to as a photomask, is used in conjunction with a light source to shine light on specific areas of the photoresist. The photomask includes the predetermined pattern printed on it.

The photoresist layer can be exposed using shadow printing or projection printing. In shadow printing the mask and the wafer may be in direct contact with, or in close proximity to, one another to directly image the pre-determined pattern of the photomask onto the photoresist layer. In projection printing, exposure tools have been developed to project an image of the mask patterns onto a resist-coated wafer to produce the pre-determined pattern on the photoresist layer.

Photoresists can be classified as positive and negative. Positive photoresists are used in additive photolithography techniques, and negative photoresists are used in the subtractive photolithography techniques. The positive and negative photoresists differ in how they respond to radiation. For positive resists, the exposed regions become more soluble and thus more easily removed in the development process. The net result is that the patterns formed on the photoresist are the same as on the mask. In contrast, the negative resists are the reverse of the mask patterns. In negative resists the exposed regions become less soluble, forming the inverse of the desired pattern.

In one embodiment, the sensor element has a surface area with a pre-determined pattern of conductive material and one or more gaps in the conductive material. In one embodiment, the pre-determined pattern may include a plurality of evenly-spaced, parallel bars, and a plurality of interconnect lines coupled between the evenly-spaced, parallel bars. The plurality of evenly-spaced, parallel bars and the plurality of interconnect lines are configured to form the one or more gaps in the conductive material of the sensor elements of the sensing device. The interconnect lines may be coupled at the end of, or at the center of the plurality of evenly-spaced, parallel bars. In another embodiment, the pre-determined pattern may be used to generate a honeycomb pattern on the sensor element. The honeycomb pattern may include hexagonal shaped gaps in the conductive material. Alternatively, other pre-determined patterns may be used to generate a sensing device having a reduced surface area.

In one embodiment, the pre-determined pattern may be generated by computerized modeling tools, and stored as a computerized data file. Alternatively, other tools may be used to generate the pre-determined patterns.

In one embodiment, the sensor element having a surface area including one or more gaps in the conductive material of the sensor element is generated by additive photolithography techniques. The additive photolithography techniques may be performed by depositing the conductive material on an insulation layer to form the sensor element (e.g., surface area) of the sensing device, depositing a photoresist layer on the conductive material, exposing the photoresist layer to light through a photomask, having a pre-determined pattern, where the pre-determined pattern is configured to form the one or more gaps in the conductive material of the sensor element of the sensing device, and etching the photoresist layer to remove the photoresist layer and the conductive material of the one or more gaps. It should be noted that the photoresist layer deposited on the one or more gaps is not exposed to the light in the additive photolithography techniques.

In one embodiment, the sensor element having a surface area including one or more gaps in the conductive material of the sensor element is generated subtractive photolithography techniques. The subtractive photolithography techniques may be performed by depositing the conductive material on an insulation layer to form the sensor element (e.g., surface area) of the sensing device, depositing a photoresist layer on the conductive material, exposing the photoresist layer to light through a photomask, having a pre-determined pattern to form an inverse of the pre-determined pattern having one or more gaps in the conductive surface of the sensor element of the sensing device, and etching the photoresist layer to remove the photoresist layer and the conductive material of the sensing area. In this embodiment, the photoresist layer deposited on the one or more gaps in the conductive material is not exposed to light, but the other conductive material is exposed to the light.

Photolithography techniques are known by those of ordinary skill in the art, and accordingly, additional details have not been included so as to not obscure the embodiments of generating the predetermined patterns described herein. In another embodiment, the shapes and patterns described herein may be generated by other manufacturing techniques, such as manufacturing techniques used in film deposition, patterning, and semiconductor doping. For example, the sensor elements having one or more gaps in the conductive material are generated by impurity doping techniques. The manufacturing techniques described herein may be used to form the shapes and patterns of the sensing device. Moreover, the manufacturing techniques described herein may be used to electrically connect and/or electrically isolate sensor elements and their corresponding conductive lines that are coupled to the processing device.

It should be noted that the one or more gaps in the conductive material of the embodiments described herein may be filled with the same material as the coating layers or dielectric layer. Alternatively, it may be filled with other materials.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting in a form (e.g., software, processing applications) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical acoustical, or other form of propagated signals (e.g., infrared signals, digital signals, etc.); or other type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
    a sensor element of a row or column of sensor elements of a sensor array of a sensing device, the sensor element having two or more gaps between electrically connected portions of the same sensor element, the two or more gaps extending in a conductive material of a surface area of the sensor element from the periphery of the sensor element toward the center;
    wherein the sensor element is electrically connected to a single conductive trace that connects the row or column of sensor elements; and
    an interconnect line, within the sensor element, that couples the electrically connected portions of the same sensor element to each other, wherein each of the electrically connected portions of the same sensor element branches from the interconnect line, and wherein each of the electrically connected portions of the same sensor element is wider than the interconnect line.

2. The apparatus of claim 1, wherein the sensor element is a substantially diamond shape.

3. The apparatus of claim 1, wherein each of the two or more gaps of the sensor element is a substantially rectangular shape.

4. The apparatus of claim 1, wherein the sensing device is at least one of a touch-sensor pad, a touch-sensor slider, or a touch-sensor button.

5. The apparatus of claim 1, further comprising a processing device coupled to the sensing device, wherein the processing device is operable to detect a presence of a conductive object on the sensing device.

6. The apparatus of claim 1, wherein the two or more gaps are substantially parallel to each other along substantially their entire lengths in the sensor element.

7. A method, comprising:
    forming a sensor element of a row or column of sensor elements of a sensor array;
    wherein the sensor element is electrically connected to a single conductive trace that connects the row or column of sensor elements;
    generating two or more gaps between electrically connected portions of the sensor element, the two or more gaps extending in a conductive material of a surface area of the sensor element from the periphery of the sensor element toward the center; and
    coupling, within the sensor element, an interconnect line to the electrically connected portions of the sensor element, wherein each of the electrically connected portions of the sensor element branches from the interconnect line, and wherein each of the electrically connected portions of the sensor element is wider than the interconnect line.

8. The method of claim 7, wherein generating the two or more gaps in the sensor element comprises using additive photolithography techniques.

9. The method of claim 8, wherein the additive photolithography techniques comprise:
- depositing the conductive material on an insulation layer to form the sensor element;
- depositing a photoresist layer on the conductive material;
- exposing the photoresist layer to light through a photomask, having a predetermined pattern, wherein the pre-determined pattern is configured to form the two or more gaps in the conductive material of the sensor element, and wherein the photoresist layer deposited on the two or more gaps is not exposed to the light; and
- etching the photoresist layer to remove the photoresist layer and the conductive material of the two or more gaps, wherein etching is configured to reduce a total surface area of the sensor element.

10. The method of claim 7, wherein generating the two or more gaps in the sensor element comprises using subtractive photolithography techniques.

11. The method of claim 10, wherein the subtractive photolithography techniques comprise:
- depositing the conductive material on an insulation layer to form the sensor element;
- depositing a photoresist layer on the conductive material;
- exposing the photoresist layer to light through a photomask, having a predetermined pattern, wherein the pre-determined pattern is configured to form an inverse of the pre-determined pattern having two or more gaps in the conductive surface of the sensor element, and wherein the photoresist layer deposited on the two or more gaps is exposed to the light; and
- etching the photoresist layer to remove the photoresist layer and the conductive material of the sensing area not exposed to the light, wherein etching is configured to reduce a total surface area of the sensor element.

12. The method of claim 11, wherein exposing the photoresist layer comprises at least one of directly imaging the pre-determined pattern of the photomask onto the photoresist layer, or projecting an image of the photomask onto the photoresist layer to produce the pre-determined pattern on the photoresist layer.

13. The method of claim 7, wherein forming the sensor element comprises using impurity doping techniques.

14. The method of claim 7, wherein generating the two or more gaps in the sensor element comprises filling the two or more gaps with at least one of coating material or dielectric material.

15. An apparatus, comprising:
- a sensing device comprising a plurality of sensor elements of a plurality of row or a columns of sensor elements arranged in an array;
- means for reducing charge time of each sensor element of the plurality of sensor elements, wherein the means for reducing charge comprises two or more gaps between electrically connected portions of the sensor element, wherein the two or more gaps extend in a conductive material of a surface area of the sensor element from the periphery of the sensor element toward the center, and wherein the sensor element is electrically connected to a single conductive trace that connects a row or column of sensor elements; and
- means for connecting the electrically connected portions of the sensor element to each other, wherein each of the electrically connected portions of the sensor element branches from the means for connecting, and wherein each of the electrically connected portions of the sensor element is wider than the means for connecting.

16. The apparatus of claim 15, further comprising means for reducing power consumption of the sensing device.

* * * * *